(12) United States Patent
Lampainen et al.

(10) Patent No.: US 11,926,128 B2
(45) Date of Patent: Mar. 12, 2024

(54) LIGHT WEIGHT LINERBOARD FOR CORRUGATED BOARD

(71) Applicant: Stora Enso OYJ, Helsinki (FI)

(72) Inventors: Seppo Lampainen, Lahti (FI); Frank Peng, Hammarö (SE); Atso Laakso, Varkaus (FI); Ari-Pekka Määttänen, Espoo (FI)

(73) Assignee: Stora Enso OYJ, Helsinki (FI)

( * ) Notice: Subject to any disclaimer, the term of this patent is extended or adjusted under 35 U.S.C. 154(b) by 23 days.

(21) Appl. No.: 17/256,058

(22) PCT Filed: Jun. 25, 2019

(86) PCT No.: PCT/IB2019/055349
§ 371 (c)(1),
(2) Date: Dec. 24, 2020

(87) PCT Pub. No.: WO2020/003128
PCT Pub. Date: Jan. 2, 2020

(65) Prior Publication Data
US 2021/0268783 A1    Sep. 2, 2021

(30) Foreign Application Priority Data

Jun. 27, 2018   (SE) .................................. 1850798-8

(51) Int. Cl.
| | | |
|---|---|---|
| *B32B 29/08* | (2006.01) | |
| *B32B 7/05* | (2019.01) | |
| *B32B 29/00* | (2006.01) | |
| *D21H 11/02* | (2006.01) | |
| *D21H 11/04* | (2006.01) | |
| *D21H 11/08* | (2006.01) | |
| *D21H 11/10* | (2006.01) | |
| *D21H 11/18* | (2006.01) | |
| *D21H 17/28* | (2006.01) | |
| *D21H 17/42* | (2006.01) | |
| *D21H 17/44* | (2006.01) | |
| *D21H 27/30* | (2006.01) | |
| *D21H 27/40* | (2006.01) | |

(52) U.S. Cl.
CPC ............... *B32B 29/08* (2013.01); *B32B 7/05* (2019.01); *B32B 29/005* (2013.01); *D21H 1/02* (2013.01); *D21H 11/02* (2013.01); *D21H 11/04* (2013.01); *D21H 11/08* (2013.01); *D21H 11/10* (2013.01); *D21H 11/18* (2013.01); *D21H 17/28* (2013.01); *D21H 17/42* (2013.01); *D21H 17/44* (2013.01); *D21H 27/40* (2013.01); *B32B 2250/26* (2013.01); *B32B 2307/546* (2013.01); *B32B 2307/718* (2013.01); *B32B 2307/72* (2013.01)

(58) Field of Classification Search
CPC .......... D21H 1/02; D21H 11/02; D21H 11/08; D21H 11/10; D21H 11/18; D21H 17/28; D21H 17/42; D21H 17/44; D21H 27/40; D21H 27/10; D21H 27/30; D21H 21/18; B32B 29/08; B32B 7/05; B32B 29/005; B32B 2250/26; B32B 2307/546; B32B 2307/718; B32B 2307/72; B32B 2250/03; B32B 2553/00; B32B 7/12; B32B 2250/02; B65D 65/403
See application file for complete search history.

(56) References Cited

U.S. PATENT DOCUMENTS

| | | | |
|---|---|---|---|
| 4,145,246 A | 3/1979 | Goheen et al. | |
| 5,080,758 A | 1/1992 | Horng | |
| 6,221,212 B1 | 4/2001 | Sjöström | |
| 6,322,667 B1 | 11/2001 | McCall et al. | |
| 7,897,011 B2 * | 3/2011 | Peng ...................... | D21H 27/38 162/149 |
| 8,142,615 B2 * | 3/2012 | Wildlock ............... | D21H 27/38 162/124 |
| 11,077,648 B2 * | 8/2021 | Heiskanen .............. | B32B 29/08 |
| 11,274,399 B2 * | 3/2022 | Svending ............... | D21H 11/14 |
| 11,339,537 B2 * | 5/2022 | Everett .................. | D21H 13/06 |
| 2003/0087066 A1 | 5/2003 | Bryden | |
| 2008/0314536 A1 * | 12/2008 | Peng ...................... | D21H 27/38 162/129 |
| 2010/0024998 A1 | 2/2010 | Wildlock et al. | |
| 2012/0273561 A1 | 11/2012 | Irvin et al. | |
| 2017/0051456 A1 * | 2/2017 | Hans ...................... | D21H 17/29 |

(Continued)

FOREIGN PATENT DOCUMENTS

| | | |
|---|---|---|
| CA | 1251718 | 3/1989 |
| CL | 2020003345 A1 | 7/2021 |

(Continued)

OTHER PUBLICATIONS

International Search Report from PCT application No. PCT/IB2019/055349 dated Sep. 12, 2019.
Tillmann, O. "Paper and Board Grades and Their Properties", In: Handbook of Paper and Board, Holik, H.: Wiley-VCH, 2006, pp. 446-466; ISBN 978-3-527-30997-9, p. 459.

(Continued)

*Primary Examiner* — Jose A Fortuna
(74) *Attorney, Agent, or Firm* — Greer, Burns & Crain, Ltd.

(57) ABSTRACT

The invention relates to a lightweight linerboard for corrugated board with good strength properties and which reduces problems with washboarding in the thereof produced corrugated board. The linerboard of the invention comprises at least one ply comprising 20-80 wt % CTMP from wood fibers and 20-80 wt % chemical pulp, all percentages calculated on the total fiber weight of said first ply, wherein the CTMP exhibits a bulk of at least 2.5 $cm^3/g$.

10 Claims, No Drawings

(56) References Cited

U.S. PATENT DOCUMENTS

| | | | |
|---|---|---|---|
| 2017/0121053 A1 | 5/2017 | Johannson et al. | |
| 2017/0284030 A1* | 10/2017 | Svending | D21H 17/68 |
| 2018/0037015 A1 | 2/2018 | Yoshii | |
| 2020/0392670 A1* | 12/2020 | Svending | D21H 27/10 |
| 2021/0221114 A1* | 7/2021 | Lampainen | D21H 11/02 |
| 2021/0268783 A1* | 9/2021 | Lampainen | D21H 11/18 |
| 2021/0277607 A1* | 9/2021 | Svending | D21H 17/675 |
| 2022/0074144 A1* | 3/2022 | Peng | D21H 23/48 |
| 2022/0154408 A1* | 5/2022 | Svending | D21H 11/04 |
| 2023/0019391 A1* | 1/2023 | Lampainen | B32B 3/28 |
| 2023/0270799 A1* | 8/2023 | Domínguez Vera | A61K 35/747 424/93.45 |

FOREIGN PATENT DOCUMENTS

| | | | | |
|---|---|---|---|---|
| CN | 103562078 A | 2/2014 | | |
| CN | 106794687 A | 5/2017 | | |
| EP | 1861544 B1 * | 7/2017 | | D21H 27/38 |
| EP | 3440259 B1 * | 2/2021 | | B32B 29/06 |
| EP | 3828339 A1 * | 6/2021 | | B32B 29/06 |
| EP | 3044370 B1 * | 2/2022 | | B32B 29/005 |
| SE | 445937 B | 7/1986 | | |
| SE | 539344 C2 * | 7/2017 | | D21C 9/007 |
| SE | 543829 C2 * | 8/2021 | | D21F 1/02 |
| WO | 9961701 | 12/1999 | | |
| WO | 2006084883 A1 | 8/2006 | | |
| WO | 2015036930 A1 | 3/2015 | | |
| WO | WO-2015036930 A1 * | 3/2015 | | B32B 29/005 |
| WO | WO-2015087293 A1 * | 6/2015 | | A61K 39/40 |
| WO | WO-2020003129 A1 * | 1/2020 | | B32B 29/005 |

OTHER PUBLICATIONS

Norgren, Sven et al., Strong Paper from spruce CTMP—Part II: Effect of pressing at nip press temperatures above the lignin softening temperature, Nordic Pulp & Paper Research Journal 2018; 33(1): 142-149.

Horn, Richard A. et al., Press drying: a way to use hardwood CTMP for high-strength paperboard, Tappi Journal, Mar. 1988.

Swedish Search Report from Swedish application No. 1850798-8 dated Jan. 7, 2019.

* cited by examiner

LIGHT WEIGHT LINERBOARD FOR CORRUGATED BOARD

This application is a U.S. National Phase under 35 U.S.C. § 371 of International Application No. PCT/IB2019/055349 filed Jun. 25, 2019, which claims priority under 35 U.S.C. §§ 119 and 365 to Swedish Application No. 1850798-8, filed Jun. 27, 2018.

TECHNICAL FIELD

The present invention relates to a linerboard for corrugated board, use of said linerboard and a corrugated board comprising said linerboard.

BACKGROUND

Corrugated board is a packaging material which can be converted to different types of packaging solutions. The corrugated board is a fiber based material comprising a corrugated medium (fluting) and at least one flat liner or linerboard attached onto a surface of the fluted medium, thus forming a sandwich structure. The central paper layer, called corrugated medium, is formed by using heat, moisture and pressure, into a corrugated shape using a corrugator. One or two flat papers, called liners, are glued to the tips of the corrugated medium. The sandwich can be formed in different ways such as in single, double, and triple walls as described in Kirwan M., J., Paper and Paperboard. Packaging Technology, Blackwell Publishing 2005.

There are different kinds of corrugated board qualities, and these might comprise different types of liners and corrugated medium. Examples of different types of liners are kraftliner, white top kraftliner and testliner. Kraftliner is typically produced from kraft pulp that can be bleached or unbleached and may comprise one or more layers/plies wherein the top layer/ply is often optimized to provide good printing surface and good moisture resistance. Testliner is mainly produced from recycled old corrugated board and is mostly done in two layers/plies. Kraftliners are frequently used in packaging boxes with higher demands on strength properties.

Environmental concerns have increased the demand for linerboards with lighter weight, thus consuming less raw material. However, decreasing the grammage of linerboards might affect the strength properties negatively, especially the bending resistance, which in turn might induce problems with interflute buckling and sagging. The problem of interflute buckling occurs when the linerplies of a corrugated box buckle under load, thus weakening of the structure strength. Sagging is a result of deformation of the bottom side of a corrugated box under load. In addition, the dimension stability might also be affected, which lead to problems with washboarding and bad printability of the thereof produced corrugated board. "Washboarding" or the "wash-board effect" is an undesired effect resulting from the corrugated board manufacturing process which might become even more visible after printing of the surface. The wash-board effect is usually associated with the interfacial glue spreading/absorption and shrinkage of the glue between the liner and the fluting during drying. As the adhesive dries the liner may take up the silhouette of the flutes causing a washboard appearance.

One challenge for the linerboard maker is thus to enable the production of a lightweight liner with maintained or improved strength properties as well as resistance towards washboarding. Another challenge connected to lightweight linerboard is to mitigate the undesired interflute buckling and sagging effects.

In multi-layered liquid packaging board, chemi-thermo-mechanical pulp (CTMP) has frequently been used in the middle ply to increase the bulk. However, its use in linerboard has been limited since it has not been considered possible to achieve the high strength properties needed for such constructions.

U.S. Pat. No. 5,080,758 discloses a linerboard sheet made substantially solely of mechanical or chemi-mechanical pulps having a first surface layer formed from fine fibre chemimechanical pulp and a second layer formed from a mechanical or chemi-mechanical pulp at least 50% of said pulp used to form said second layer being a coarse mechanical pulp. The fine fibre pulp is formed from Western Red Cedar and the second layer formed from a mixture of Douglas Fir and Western Red Cedar. However, the strength properties, with e.g. burst indexes of only around 2 kPa·m2/g, does not make this suitable to be used as a substitute for kraft liners in all applications.

SUMMARY

It is an object of the present invention to provide a lightweight linerboard which exhibits high strength properties and which eliminates or alleviates at least some of the disadvantages of the use of the prior art lightweight linerboards in corrugated board. More specific objects include providing a linerboard and a corrugated board having reduced wash-board effect and improved strength properties.

The invention is defined by the appended independent claims. Embodiments are set forth in the appended dependent claims and in the following description.

In a first aspect, the invention discloses a linerboard for corrugated board, which linerboard comprises a first ply comprising 20-80 wt % CTMP from wood fibers and 20-80 wt % chemical pulp, all percentages calculated on the total fiber weight of said first ply, wherein the CTMP exhibits a bulk of at least 2.5 $cm^3/g$ The inventors of the present invention have surprisingly found the use of CTMP with rather high bulk in one of the plies of the linerboard makes it possible to produce a lightweight linerboard with remarkably good strength properties and which reduces problems with washboarding in the thereof produced corrugated board. Without wishing to be bound to any theory, this is believed to be due to that the said linerboard has a higher resistance towards dimensional changes when subjected to moisture. In addition, the CTMP with high bulk has less tendency to shrinkage, which further reduces problems with washboarding. Moreover, the inventive linerboard has further shown to be more resistant to interflute buckling and sagging.

In a second aspect, the invention relates to use of a linerboard as disclosed herein in the manufacturing of a corrugated board to reduce the washboard effect.

In a third aspect, the invention relates to a corrugated board comprising a corrugated medium and at least one linerboard, which linerboard comprises a first ply comprising 20-80 wt % CTMP from wood fibers and 20-80 wt % chemical pulp, all percentages calculated on the total fiber weight of said ply, wherein the CTMP exhibits a bulk of at least 2.5. It has been shown that a corrugated board according to the invention exhibits high strength properties and low tendency of washboarding and interflute buckling.

Measurement and Evaluation Methods

The following methods and evaluation methods are referred to in the description and in the patent claims.

Freeness of the pulps refer to Canadian Standard Freeness (CSF) and is measured according to ISO 5267-2

Shopper Riegler (°SR) value is measured according to ISO 5267-1

Tensile Index is measured in accordance with ISO1924-3

Scott Bond is measured in accordance with TAPPI UM-403

Density is measured in accordance with ISO 534:2005

Bulk is measured in accordance with ISO 534:2005

Geometric SCT index is measured in accordance with ISO 9895 and is calculated as the square root of the product of the SCT index in MD and CD. The SCT index defines the compression strength of the ply or linerboard.

Burst index is measure din accordance with ISO 2759

Bending resistance is measured at an angle of 15° by use of Lorentzen & Wettre instrument in accordance with ISO 2493-1, bending length 10 mm. Geometric bending resistance index is calculated as the square root of the product of the bending resistance index in MD and CD.

Moisture content is measured in accordance with ISO 287

The grammage refers to the weight expressed as grams per square meter, gsm or $g/m^2$ and is measured in accordance with ISO 536. As used herein, gsm and $g/m^2$ may be used interchangeable.

DETAILED DESCRIPTION

The present invention relates to a linerboard and to a corrugated board comprising a corrugated medium (fluting) and at least one linerboard. The corrugated fiberboard is manufactured from pulps comprising cellulosic fibers. The corrugated board preferably comprises at least two liners and at least one corrugated medium. The corrugated board may also comprise more than one corrugated mediums and more than two liners. The liner is attached to at least one surface of the corrugated medium by an adhesive. The linerboard of the present invention is intended to be used as a light-weight substitute to kraft liners and thus in high quality corrugated board.

CTMP as used herein is meant to define chemi-thermo mechanical pulp of cellulosic fibers. CTMP is normally produced by impregnating wood chips with sodium sulphite before grinding. The CTMP used in accordance with the invention may be bleached or unbleached and produced from softwood and/or hardwood fibers, but is preferably made from softwood fibers and is preferably unbleached. The high bulk of the CTMP used in the present invention may be ensured by regulating the amount of added strength additives and by adjusting the refining of the CTMP. The skilled person is well aware of how adjust the bulk of CTMP. For example, the bulk can be adjusted by refining to different freeness in HC refining (high consistency refining) of the CTMP pulp. HC refining can further be done at high temperature to achieve HT-CTMP. Alternatively the CTMP pulp may be further LC refined in the CTMP line or at the paperboard machine.

The linerboard of the invention comprises at least a first ply, comprising 20-80 wt % CTMP with high bulk. The use of CTMP with high bulk makes it possible for the linerboard producer to reduce the grammage of the linerboard and still avoid problems with washboarding in the thereof produced corrugated board. The bulk of the CTMP used in the invention is at least 2.5 $cm^3/g$, preferably at least 3 cm/g, most preferably at least 3.5 $cm^3/g$.

The strength properties of CTMP from spruce are much weaker compared to unbleached kraft pulp, which is shown in table 1 below wherein the tensile index and the Scott Bond of CTMP refined to different freeness are shown in comparison with unbleached kraft pulp (UKP) from softwood. The properties of the pulps are shown in table 1.

Thus, the skilled person would not from the knowledge of the strength properties for CTMP in comparison with unbleached kraft pulp believe that it is possible to produce a high strength linerboard with high amount of CTMP. However, contrary to the expectation, the inventors to this invention have shown this possible.

TABLE 1

| properties of CTMP and UKP | | | |
|---|---|---|---|
| | CTMP unref | CTMP 200 | UKP |
| Freeness [CSF] | 540 | 340 | |
| Shopper Riegler (SR) | | | 21 |
| Tensile index [Nm/g] | 24.6 | 34.9 | 76 |
| Scott Bond [J/m2] | 80 | 150 | 580 |
| Density [$kg/m^3$] | 303 | 390 | 565 |
| Bulk [$cm^3/g$] | 3.3 | 2.6 | 1.8 |

The first ply of the invention may exhibit a geometric average bending resistance index of at least 150 $Nm^6/kg^3$, preferably at least 170 $Nm^6/kg^3$, most preferably at least 180 $Nm^6/kg^3$ and/or a geometric SCT index of at least 22 Nm/g, preferably at least 24 Nm/g or at least 25 Nm/g. In addition, said first ply may exhibit a burst index of at least 2.5 $kPam^2/g$, preferably at least 3 $kPam^2/g$ and a Scott Bond of at least 150 $J/m^2$, preferably at least 180 $J/m^2$ or at least 200 or even at least 250 $J/m^2$.

In one embodiment of the invention, the first ply comprises 20-80 wt % CTMP, or 20-70 wt % CTMP, or 30-80 wt % CTMP or 30-70 wt % CTMP, or at least 40 wt % CTMP or 40-80 wt % CTMP or 40-70 wt % CTMP calculated on the total fiber weight of said ply. The remaining pulp may be bleached or unbleached chemical pulp, preferably kraft pulp, most preferably kraft pulp from virgin fibers from hardwood or softwood. In one embodiment, the ply may further comprise recycled fibers, such as recycled fibers from OCC in an amount of e.g. 0-30 wt %.

The first ply may have a density of below 690 kg/m$^3$, such as between 600-690 kg/m$^3$, preferably below 660, e.g. between 600-660 kg/m$^3$ or even below 650 kg/m$^3$, e.g. between 600-650 kg/m$^3$. In embodiments wherein the first ply comprises at least 40 wt %, such as between 40-80 wt % CTMP, the density of the said ply is preferably below 660 kg/m$^3$ or below 650 kg/m$^3$.

The invention enables the production of low weight linerboard with high strength. In one embodiment, the basis weight of the linerboard is below 170 gsm or below 150 gsm or below 130 gsm. The basis weight of the linerboard may e.g. be between 80-170 gsm, or between 80-165 gsm or 80-160 gsm or 80-150 gsm.

In one embodiment, the CTMP used in the linerboard of the invention has a freeness of at least 300 ml, preferably of between 300-700 ml, or between 350-700 ml or 400-700 ml or 500-700 ml. It has surprisingly been shown that high freeness CTMP can be used to produce light-weight linerboards without compromising the strength properties. In addition to enabling savings in energy, a high freeness pulp may also provide a high bulk, which has been found to also diminish problem with washboarding and interflute buckling.

In one preferred embodiment of the invention, the linerboard further comprises a second ply, which second ply comprises 0-70 wt % CTMP and 30-100 wt % chemical pulp, such as kraft pulp, all percentages calculated on the total fiber weight of said second ply. In one embodiment, said second ply may comprise 100 wt % kraft pulp, which may be bleached or unbleached. Preferably, said second ply forms a top ply on the print side of the thereof produced corrugated board.

The linerboard of the invention may further comprise a third ply, which third ply comprises 0-70 wt % CTMP and 30-100 wt % kraft pulp and wherein said second ply forms a top ply, said first ply forms a middle ply and said third ply forms a back ply. In the thereof produced corrugated board, said top ply forms the print side and said back ply is to be in contact with or facing against the corrugated medium. This three-ply embodiment enables the use of even lower grammages, but still achieve high bending stiffness and provides high resistance to interflute buckling and washboarding. In one embodiment, said third ply also comprises at least 20 wt % CTMP or at least 30 wt % CTMP, e.g. between 20-70 wt % CTMP or 30-70 wt % CTMP. The advantage of having CTMP in the back ply is that it has shown to improve hydrophobicity, which diminishes the washboard effect even further.

In one embodiment, both said second and said third ply, forming the surface plies of the linerboard, comprise 100 wt % kraft pulp calculated on the total fiber weight of said layers. In this way, an I beam structure is achieved which enhances the strength properties even further.

The linerboard of the invention may further comprise further plies, such as a fourth ply, arranged as a middle ply, between said second and third plies. Such further plies may comprise any kind of fibers or pulp combinations.

The linerboard of the invention may exhibit a bending resistance index according to ISO 2493-1 of at least 170 Nm$^6$/kg$^3$, or at least 175 Nm$^6$/kg$^3$ or at least 180 Nm$^6$/kg$^3$ or even at least 185 Nm$^6$/kg$^3$. The linerboard of the invention may further exhibit a density of below 710 kg/m$^3$, preferably below 700 kg/m$^3$ or below 680 kg/m$^3$. The density may be in the range of between 600-710 kg/m$^3$, or 600-700 kg/m$^3$, or 600-680 kg/m$^3$. It has surprisingly been shown that it is possible to produce a linerboard with such low density and still achieve a high bending resistance index. This enables the board-maker to produce lightweight linerboard without problems with interflute buckling in the thereof produced corrugated board.

In one embodiment of the invention, the linerboard further comprises additives chosen from the group of starch, microfibrillated cellulose (MFC) and/or anionic or cationic polymers or combinations thereof. The anionic or cationic polymer is preferably chosen from the group of carboxymethyl cellulose (CMC), anionic polyacrylamide (APAM) or cationic polyacrylamide (CPAM) or combinations thereof. The said additive is preferably added to at least said first ply, but preferably at least to all plies comprising CTMP. MFC may be added in an amount of between 0.1-10 wt %, preferably between 1-7 wt % as calculated on the total solid content of the ply where MFC is added. Starch, preferably cationic starch, may be added in an amount of 0.5-5 wt %, preferably in an amount of 1-3 wt %. Anionic or cationic polymers, such as CMC, APAM or CPAM, may be added in an amount of 0.1-1 wt %, preferably 0.1-0.5 wt %. In one embodiment, the linerboard comprises MFC. The linerboard may comprise MFC and starch or MFC and anionic or cationic polymer. Preferably, the additives are pre-mixed before added to the pulp furnish.

Microfibrillated cellulose (MFC) shall in the context of the patent application mean a nano scale cellulose particle fiber or fibril with at least one dimension less than 100 nm. MFC comprises partly or totally fibrillated cellulose or lignocellulose fibers. The liberated fibrils have a diameter less than 100 nm, whereas the actual fibril diameter or particle size distribution and/or aspect ratio (length/width) depends on the source and the manufacturing methods.

The smallest fibril is called elementary fibril and has a diameter of approximately 2-4 nm (see e.g. Chinga-Carrasco, G., Cellulose fibres, nanofibrils and microfibrils: The morphological sequence of MFC components from a plant physiology and fibre technology point of view, Nanoscale research letters 2011, 6:417), while it is common that the aggregated form of the elementary fibrils, also defined as microfibril (Fengel, D., Ultrastructural behavior of cell wall polysaccharides, Tappi J., March 1970, Vol 53, No. 3), is the main product that is obtained when making MFC e.g. by using an extended refining process or pressure-drop disintegration process. Depending on the source and the manufacturing process, the length of the fibrils can vary from around 1 to more than 10 micrometers. A coarse MFC grade might contain a substantial fraction of fibrillated fibers, i.e. protruding fibrils from the tracheid (cellulose fiber), and with a certain amount of fibrils liberated from the tracheid (cellulose fiber).

There are different acronyms for MFC such as cellulose microfibrils, fibrillated cellulose, nanofibrillated cellulose, fibril aggregates, nanoscale cellulose fibrils, cellulose nanofibers, cellulose nanofibrils, cellulose microfibers, cellulose fibrils, microfibrillar cellulose, microfibril aggregates and cellulose microfibril aggregates. MFC can also be characterized by various physical or physical-chemical properties such as large surface area or its ability to form a gel-like material at low solids (1-5 wt %) when dispersed in water. The cellulose fiber is preferably fibrillated to such an extent that the final specific surface area of the formed MFC is from about 1 to about 300 $m^2/g$, such as from 1 to 200 $m^2/g$ or more preferably 50-200 $m^2/g$ when determined for a freeze-dried material with the BET method.

Various methods exist to make MFC, such as single or multiple pass refining, pre-hydrolysis followed by refining or high shear disintegration or liberation of fibrils. One or several pre-treatment step is usually required in order to make MFC manufacturing both energy efficient and sustainable. The cellulose fibers of the pulp to be supplied may thus be pre-treated enzymatically or chemically, for example to reduce the quantity of hemicellulose or lignin. The cellulose fibers may be chemically modified before fibrillation, wherein the cellulose molecules contain functional groups other (or more) than found in the original cellulose. Such groups include, among others, carboxymethyl (CM), aldehyde and/or carboxyl groups (cellulose obtained by N-oxyl mediated oxydation, for example "TEMPO"), or quaternary ammonium (cationic cellulose). After being modified or oxidized in one of the above-described methods, it is easier to disintegrate the fibers into MFC or nanofibrillar size fibrils.

The nanofibrillar cellulose may contain some hemicelluloses; the amount is dependent on the plant source. Mechanical disintegration of the pre-treated fibers, e.g. hydrolysed, pre-swelled, or oxidized cellulose raw material is carried out with suitable equipment such as a refiner, grinder, homogenizer, colloider, friction grinder, ultrasound sonicator, single- or twin-screw extruder, fluidizer such as microfluidizer, macrofluidizer or fluidizer-type homogenizer. Depending on the MFC manufacturing method, the product might also contain fines, or nanocrystalline cellulose or e.g. other chemicals present in wood fibers or in papermaking process. The product might also contain various amounts of micron size fiber particles that have not been efficiently fibrillated.

MFC is produced from wood cellulose fibers, both from hardwood or softwood fibers. It can also be made from microbial sources, agricultural fibers such as wheat straw pulp, bamboo, bagasse, or other non-wood fiber sources. It is preferably made from pulp including pulp from virgin fiber, e.g. mechanical, chemical and/or chemi-mechanical pulps. It can also be made from broke or recycled paper.

The above described definition of MFC includes, but is not limited to, the new proposed TAPPI standard W13021 on cellulose nanofibril (CNF) defining a cellulose nanofiber material containing multiple elementary fibrils with both crystalline and amorphous regions.

Example 1

In order to evaluate the linerboard and the ply of the invention, a test series was performed in which a ply made from 100 wt % unbleached kraft pulp (UKP) (ref) from pine was compared with plies made from a mixture of UKP and different amounts of CTMP. The properties of the pulps (UKP, CTMP unrefined and CTMP 200) used in this example 1 are shown in table 1 above. In addition, strength additives were added in different amounts and combinations to the different furnishes.

TABLE 2

| Trial Point | 1 (ref) | 2 | 3 | 4 | 5 | 6 | 7 | 8 | 9 |
|---|---|---|---|---|---|---|---|---|---|
| UKP [wt %] | 100 | 80 | 60 | 40 | 60 | 40 | 60 | 60 | 60 |
| CTMP unref [wt %] | | | | | | | 40 | | |
| CTMP 200 [wt %] | | 20 | 40 | 60 | 40 | 60 | | 40 | 40 |
| Starch [g/t] | | | | | 10 | 10 | 10 | 20 | 40 |
| MFC [wt %] | | | | | 5 | 5 | 5 | | |
| CMC [kg/t] | | | | | | | | | 4 |
| C-PAM [g/t] | 150 | 150 | 150 | 150 | 150 | 150 | 150 | 150 | 150 |
| Silica [g/t] | 650 | 650 | 650 | 650 | 650 | 650 | 650 | 650 | 650 |
| AKD [kg/t] | 1.5 | 1.5 | 1.5 | 1.5 | 1.5 | 1.5 | 1.5 | 1.5 | 1.5 |

Table 2 shows the content of the furnishes used to produce ply 1 (ref) and ply 2-9 (invention). The content of UKP and CTMP respectively is expressed as wt % as calculated on the total fiber weight.

The plies were made on a pilot machine where the furnish was applied on a wire of the forming section followed by press section and drying section and further calandered using a line load of 50 kN/m.

The properties of the thereby made plies are shown in table 3.

TABLE 3

| Trial point | 1 (ref) | 2 | 3 | 4 | 5 | 6 | 7 | 8 | 9 |
|---|---|---|---|---|---|---|---|---|---|
| Grammage (gsm) | 129.3 | 125.9 | 126 | 127.4 | 127.7 | 128.5 | 129.2 | 129.2 | 127.3 |
| Density [kg/m³] | 725 | 688 | 629 | 593 | 657 | 622 | 622 | 603 | 627 |
| SCT index (geometric) [Nm/g] | 24.8 | 26.4 | 24.8 | 22.5 | 26.9 | 26.7 | 24.3 | 24.5 | 26.7 |

TABLE 3-continued

| Trial point | 1 (ref) | 2 | 3 | 4 | 5 | 6 | 7 | 8 | 9 |
|---|---|---|---|---|---|---|---|---|---|
| Burst index [kPam²/g] | 3.7 | 3.4 | 3.0 | 2.5 | 3.3 | 3.0 | 3.5 | 3.3 | 4.0 |
| Scott Bond [J/m2] | 277 | 249 | 200 | 180 | 341 | 319 | 307 | 291 | 336 |
| Bending resistance index, GM [Nm6/kg3] | 143 | 162 | 179 | 189 | 167 | 185 | 177 | 190 | 196 |
| Moisture content [wt %] at 23° C., 50% RH | 7.8 | 7.8 | 7.6 | 7.6 | 7.8 | 7.8 | 7.6 | 7.6 | 7.9 |
| Moisture content [wt %] at 23° C., 90% RH | 20.7 | 19.7 | 18.9 | 18.0 | 17.1 | 16.9 | 16.3 | 16.7 | 16.8 |

Table 3 shows the measured properties of the produced plies 1-9, including geometric SCT index, burst index, Scott bond, Bending resistance index (GM). The physical testing was done at 50% RH 23° C., unless otherwise stated.

As can be seen in table 2, the strength properties SCT, burst index and scott bond all reduced slightly at the addition of CTMP, but could be fully recovered by the addition of strength additives such as MFC, starch and/or cmc. Particularly remarkable is that the use of unrefined CTMP (sample 7) still shows such high strength properties. The bending resistance index even increased with CTMP.

The moisture content of the reference board comprising 100 wt % UKP is significantly higher at 90% RH. Thus, the paperboard of the invention has a more hydrophobic nature and thus much more resistant to washboarding.

Example 2

Another trial was carried out on a board machine producing a 125 gsm linerboard and a 170 gsm linerboard, each of a two-ply construction having a first ply comprising CTMP to form the back ply in the thereof produced corrugated board and a second ply of Unbleached Kraft Pulp (UKP) to form the top ply in the thereof produced corrugated board. As references a 125 gsm and a 170 gsm two-ply linerboards comprising recycled fibers (RCF) from OCC were further produced.

The same production conditions were used for the manufacturing of both the reference samples and the linerboards of the invention. Table 4 shows the properties of the pulps used in this example 2.

TABLE 4

|  | CTMP | UKP | RCF-pulp |
|---|---|---|---|
| Freeness [CSF] | 470 |  |  |
| Shopper Riegler (SR) |  | 24.5 | 30.8 |
| Tensile index [Nm/g] | 27.8 | 88.0 | 35.9 |
| Density [kg/m³] | 350 | 681 | 585 |
| Bulk [cm³/g] | 2.9 | 1.5 | 1.7 |

Table 5 shows the compositions of the reference linerboards (Ref 1b and 3b) and linerboards produced according to the invention (Linerboard samples 2b and 4b). The back plies may further comprise broke (e.g. 10-30 wt %).

TABLE 5

| | | Linerboard sample | | | |
|---|---|---|---|---|---|
| | | 1b (ref) 125 gsm | 2b 125 gsm | 3b (ref) 170 gsm | 4b 170 gsm |
| Top Ply | CTMP [wt %] | 0 | 0 | 0 | 0 |
| | UKP [wt %] | 100 | 100 | 100 | 100 |
| | Grammage [gsm] | 70 | 70 | 70 | 70 |
| Back Ply | CTMP [wt %] | 0 | 35 | 0 | 60 |
| | RCF [wt %] | 35 | 0 | 60 | 0 |
| | UKP [wt %] (+broke) | 65 | 65 | 40 | 40 |
| | Grammage [gsm] | 55 | 55 | 100 | 100 |

Additives were added to the furnishes forming the plies in accordance with table 6.

TABLE 6

| | | Linerboard Sample | | | |
|---|---|---|---|---|---|
| | | 1b (ref) | 2b | 3b (ref) | 4b |
| Top Ply | Starch [g/t] | 7 | 7 | 7 | 7 |
| | C-PAM [g/t] | 200 | 200 | 200 | 200 |
| | Silica [Kg/t] | 1 | 1 | 1 | 1 |
| | AKD [Kg/t] | 1.2 | 1.2 | 1.2 | 1.2 |
| Back Ply | Starch [g/t] | 7 | 7 | 7 | 7 |
| | C-PAM [g/t] | 200 | 200 | 200 | 200 |
| | Silica [g/t] | 1 | 1 | 1 | 1 |
| | AKD [g/t] | 1.2 | 1.2 | 1.2 | 1.2 |

The properties of the thereby produced linerboard samples are shown in table 7. Table 7 shows the measured properties of the produced linerboard (1-3) including geometric SCT index, burst index, Scott bond (MD), Bending resistance index (GM). The physical testing was done at 50% RH 23° C., unless otherwise stated.

TABLE 7

| | Trial point | | | |
|---|---|---|---|---|
| | 1b (ref) | 2b | 3b (ref) | 4b |
| Grammage (g/m2) | 125 ref | 125 | 170 ref | 170 |
| Density [kg/m³] | 735 | 700 | 746 | 667 |
| SCT CD index [Nm/g] | 21.6 | 21.6 | 20.0 | 20.6 |

TABLE 7-continued

| | Trial point | | | |
|---|---|---|---|---|
| | 1b (ref) | 2b | 3b (ref) | 4b |
| Burst index [kPam²/g] | 4.4 | 4.5 | 4.2 | 4.2 |
| Scott Bond MD [J/m2] | 310 | 260 | 270 | 220 |
| Bending resistance index, GM [Nm6/kg3] | 169 | 188 | 158 | 178 |

As can be seen in table 7, the bending resistance index is improved in the samples produced in accordance with the invention, while the burst index and SCT were substantially unaffected. The densities of the inventive linerboards were significantly reduced.

Example 3

In another trial, a corrugated board (Corrugated Board 1) was made using two liners made from the 125 gsm two-ply linerboard produced in example 2 comprising CTMP and a fluting with a flute profile (B) made from NSSC pulp. The fluting was arranged between said liners. A reference corrugated board was made using a 125 gsm two-ply linerboard made from 100 wt % unbleached kraft pulp and a fluting with B flute made from 100 wt % NSSC pulp. The reference corrugated board was made in the same manner as the board in accordance with the invention, with the only difference that the inventive board comprised CTMP in the first ply of the linerboard.

The washboard effect of both the inventive board and the reference board was measured by use of CORROCHECK and is defined as the deviation in height of a nearly flat surface. The deviation in height (or depth respectively) named WBE is calculated as follows:

$$WBE = 3/2n \sum_{i=1}^{n} hi$$

Wherein hi=zi−ri

Corrugated cardboard samples are not perfectly flat. Therefore, the theoretical surface zi is calculated first. hi is calculated as the difference between theoretical flat surface zi and real surface ri.

As can be seen in table 8, the corrugated board 1 according to the invention shows a significant lower washboard effect.

TABLE 8

| | Reference Board | Corrugated Board 1 |
|---|---|---|
| WBE [mm] single-facer side | 0.046 | 0.036 |
| WBE [mm] double-facer side | 0.041 | 0.037 |

The invention claimed is:

1. A corrugated board comprising:
   a corrugated medium, and
   a linerboard, wherein the linerboard has a grammage between 80 to 150 gsm and wherein the linerboard comprises:
      a first ply, wherein said first ply comprises 20-80 wt % CTMP from wood fibers and 80-20 wt % chemical pulp, all percentages calculated on a total fiber weight of said first ply, and
      wherein the CTMP exhibits a bulk according to ISO 534:2005 of at least 2.5 cm³/g,
      wherein the CTMP has a freeness according to ISO 5267-2 of at least 300 ml, and,
      wherein said first ply has a density according to ISO 534 of below 690 kg/m³,
      a second ply, wherein the second ply comprises 100 wt % kraft pulp calculated on a total fiber weight of said second ply,
      a third ply, wherein the third ply comprises 30-70 wt % CTMP and 30-70 wt % kraft pulp calculated on a total fiber weight of said third ply, and
      wherein said second ply forms a top ply, said first ply forms a middle ply, and said third ply forms a back ply.

2. The corrugated board according to claim 1, wherein said first ply exhibits a geometric bending resistance index according to ISO 2493-1, using a bending length of 10 mm, of at least 150 Nm 6/kg 3, or a geometric SCT index according to ISO 9895 of at least 22 Nm/g, or both.

3. The corrugated board according to claim 1, wherein said linerboard exhibits a bending resistance index according to ISO 2493-1, using a bending length of 10 mm, of at least 170 Nm⁶/kg³.

4. The corrugated board according to claim 1, wherein a density of the linerboard is below 710 Kg/m³.

5. The corrugated board according to claim 1, further comprising:
   one or more additives selected from a group consisting of: starch, microfibrillated cellulose, anionic polymers, cationic polymers, and combinations thereof.

6. A process comprising:
   manufacturing of the corrugated board by providing the corrugated medium and providing the linerboard according to claim 1 and combining the corrugated medium and the linerboard to form the corrugated board.

7. The corrugated board according to claim 1, wherein said first ply exhibits a geometric bending resistance index according to ISO 2493-1, using a bending length of 10 mm, of at least 170 Nm⁶/kg³, or a geometric SCT index according to ISO 9895 of at least 24 Nm/g, or both.

8. The corrugated board according to claim 1, wherein the CTMP of said first ply has a freeness according to ISO 5267-2 of between 500 to 700 ml.

9. The corrugated board according to claim 1, wherein the CTMP of said first ply exhibits a bulk according to ISO 534:2005 of at least 3.0 cm³/g.

10. The corrugated board according to claim 1, wherein the CTMP of said first ply exhibits a bulk according to ISO 534:2005 of at least 3.5 cm³/g.

* * * * *